J. L. SMITH.

Corn-Planter

No. 28,943.

Patented June 26, 1860.

Witnesses:
J. H. Orr
Wm. F. Richstein

Inventor.
James L. × Smith
his mark.

UNITED STATES PATENT OFFICE.

JAS. L. SMITH, OF NEOGA, ILLINOIS, ASSIGNOR TO HIMSELF AND JAS. Q. SLOAN, OF SAME PLACE.

IMPROVEMENT IN CORN-PLANTERS.

Specification forming part of Letters Patent No. 28,943, dated June 26, 1860.

*To all whom it may concern:*

Be it known that I, JAMES L. SMITH, of Neoga, in the county of Cumberland and State of Illinois, have invented certain Improvements in Corn-Planters, the construction and operation of which I have described in the following specification, and illustrated in its accompanying drawings, with sufficient clearness to enable competent and skillful workmen in the arts to which it pertains or is most nearly allied to make and use my invention.

My said invention consists in the peculiar arrangement of parts in combination with each other, hereinafter described, by which the construction and operation of the machine are rendered more satisfactory.

Figure 1:
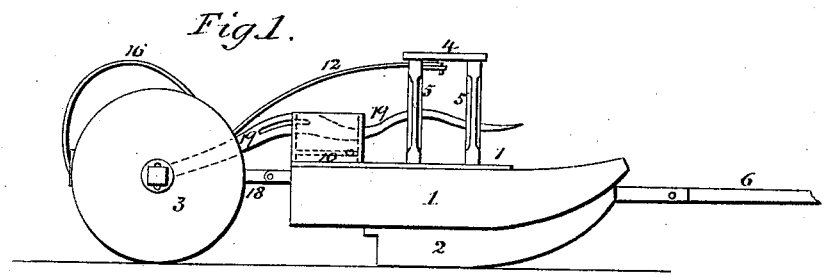
Figure 3:
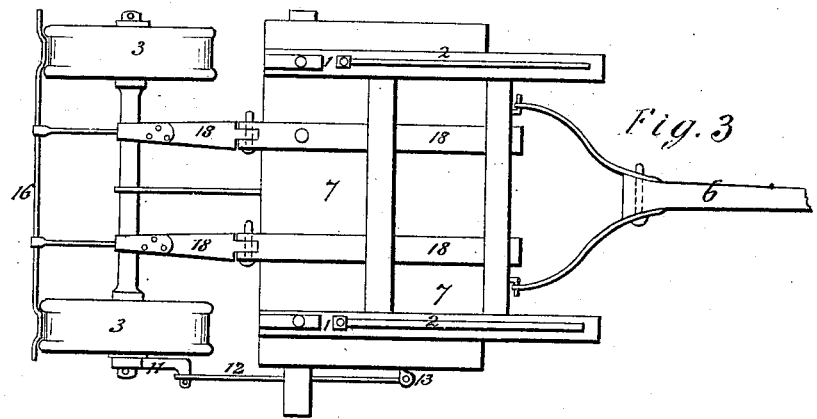
Figure 2:
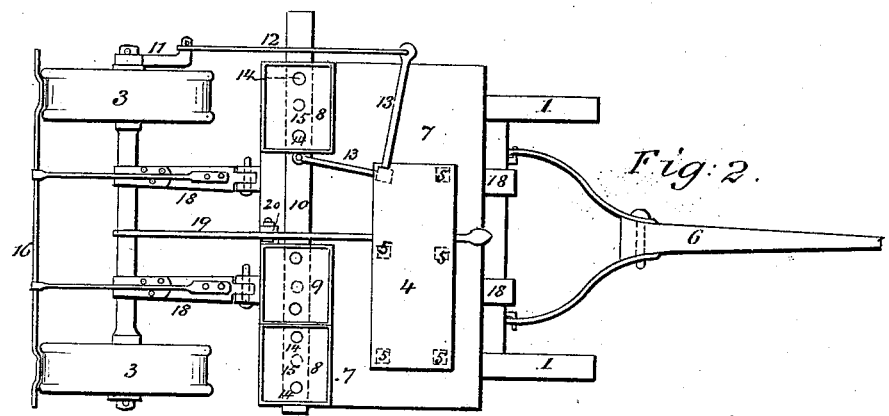

My invention is illustrated in the accompanying drawings as follows:

Figure 1 is a side elevation of my machine. Fig. 2 is a plan of it. Fig. 3 is an under side view.

1 1 are the wooden runners which form a part of the frame of the machine, and upon which the other parts are supported.

2 2 are iron furrowing-plates, which make an opening in the soil to receive the seed, which is dropped immediately behind them, and covered by the traction-wheels 3 3, which are concave on their faces for that purpose.

4 is the driver's seat, which is supported on posts 5 5.

6 is the tongue of the machine, by which it is drawn. 7 is a platform upon which the seat, seed-boxes, and some of the gearing are supported.

8 8 are the seed-boxes, and 9 is a box for containing some fertilizing compound. All these boxes, 8 8 and 9, are placed over the slide 10, by which the seed and fertilizer are taken from the boxes and dropped into or upon the soil. This slide is operated by a crank, 11, through the medium of a connecting-rod, 12, and a bent lever, 13, the fulcrum-bearings of which are hung in the seat 4 and the platform 7. The seed is delivered to the slide through the holes 14 at each end of the bottom of the seed-boxes, which brings the point at which the seed is let into the slide nearly at the end of its stroke. The dotted circle 15 represents the hole in the under lining below the slide, through which the seed is discharged to the ground. This is in a central position between the holes 14, and is at the point which the slide would reach at the middle of its stroke when it is in the most rapid motion.

The slide is represented in the drawings as being in such a position as would bring the seed-cavity in it under one of the holes in the seed-box.

It is obvious that the arrangement described, while it furnishes a ready and convenient means of operating the slide, will also give the largest possible time for the reception of the seed into the slide and the most prompt and active discharge at the middle of the stroke. As the seed is taken from each end of the box alternately, it is obvious that a double and more efficient agitation of the seed is thereby secured. The same remarks apply to the discharge of the fertilizer.

To prevent the machine from clogging in wet land, so as to work badly, I attach a bar, 16, by means of the braces 17, in such a manner as to scrape the dirt from the wheels, should it lodge upon them in any considerable thickness. It will be seen by an inspection of the parts and a consideration of their obvious operation that the fertilizer is dropped upon the top of the ground in transverse line with the hills, and therefore furnishes a guide for planting check-rows on the return-trip. It is of course necessary to throw the dropping apparatus out of gear at the end of each row to get the machine into the proper position to commence the next trip across the field. For this purpose the axle of the traction-wheels is connected to the main frame by means of the jointed arms 18 18, which allows them to be raised, by means of the lever 19, and supported upon the main-frame, the weight of the driver and the forward parts of the machine being sufficient to prevent the forward end of the machine from being tipped up by this operation. The lever 19 is supported upon a fulcrum, 20, and is slotted to allow it to slide upon this fulcrum. It is extended forward of the driver's seat, as shown, and is operated to raise the traction-wheels by pressing down its forward end.

Having fully described my said invention, I claim—

The arrangement of the seed-boxes 8 9, slide 10, crank 11, levers 12 13, operating as described, for the purposes specified.

JAMES L. ✕ SMITH.
his mark.

Witnesses:
J. H. ORR,
WM. F. RICHSTEIN.